April 28, 1931.   G. D. GARDNER   1,802,973

AUTOMATIC GRIPPING MECHANISM

Filed Sept. 21, 1929

INVENTOR.
GEORGE D. GARDNER

BY
ATTORNEYS.

Patented Apr. 28, 1931

1,802,973

UNITED STATES PATENT OFFICE

GEORGE D. GARDNER, OF SAN JOSE, CALIFORNIA, ASSIGNOR, BY MESNE ASSIGNMENTS, TO BARRON GRAY PACKING COMPANY, OF SAN JOSE, CALIFORNIA, A CORPORATION OF CALIFORNIA

AUTOMATIC GRIPPING MECHANISM

Application filed September 21, 1929. Serial No. 394,251.

The invention relates to gripping mechanisms for fruit or vegetable trimming machines and the like.

The primary object of the invention is the provision of automatically actuated fruit or vegetable grippers which are adapted to be used in connection with fruit and vegetable trimming machines, for carrying fruit or vegetables into operative relation to the trimming elements of the machine; means being provided for automatically opening each gripper when it reaches a discharge position, whereby the fruits or vegetables are released thereat, said means also holding the respective gripper in open position for a sufficiently long period to allow the placing of untrimmed fruit or vegetable thereinto.

Another object of the invention is the provision of a stationary element in operative relation to traveling holders or grippers, for articles to be worked upon, to open each gripper, when the same travels past the said element, thus releasing the article therefrom; said element being so formed as to maintain the respective gripper in open position for a sufficiently long period to allow the placing of another article thereinto.

Another object of the invention is to provide a plurality of article holders or grippers on a rotary table, and means related to the table to open each gripper when the same reaches a discharge position, and to maintain the same in open position long enough to allow the feeding of another article thereinto; resilient means being provided to close the gripper and to hold the same in gripping position before and after its engagement with said openng means.

Other objects and advantages are to provide a gripping mechanism for fruit or vegetable trimming machines that will be superior in point of simplicity, inexpensiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawings in which

Figure 1:
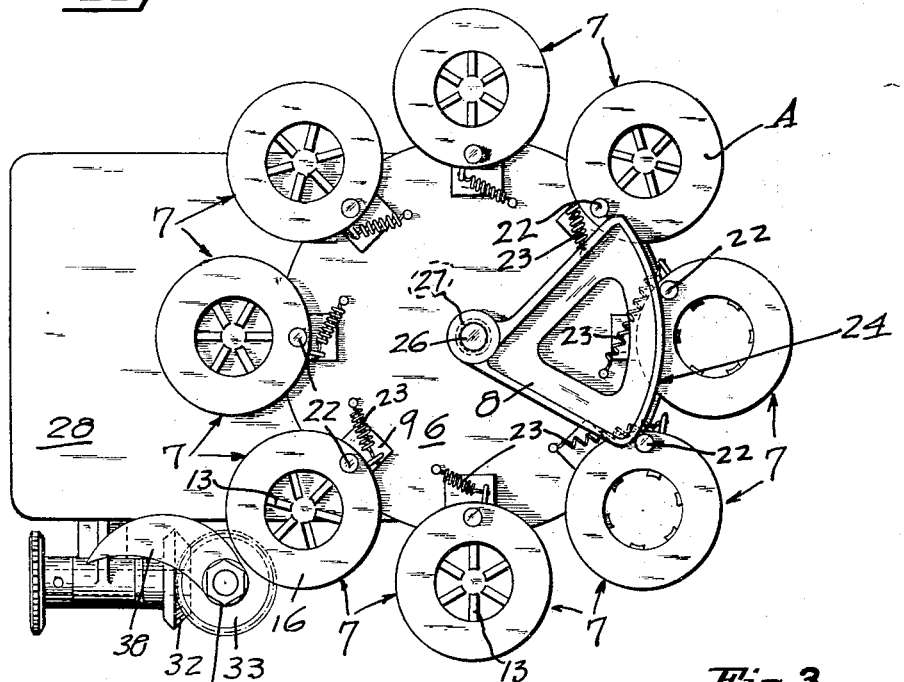
Fig. 1 is a plan view of the machine, and the grippers thereon in operative relation to the gripper actuating cam.

In its general organization my invention comprises a rotary table 6, the upper face of which is provided with a plurality of fruit or vegetable holders or grippers 7, mounted in spaced circumferential relation therearound, and a stationary cam 8, to open each gripper 7 when the same travels past the cam.

Each gripper 7 is mounted on an upstanding bracket 9, that is fixedly attached to the upper face of the table 6. A ring base plate 11 is secured on one side of its circumference to the bracket 9, so that said ring base plate 11 lies on a plane substantially parallel to that of the upper face of the table 6. The brackets 9 are disposed adjacent the outer periphery of the table 6, and the ring base plates 11 are mounted on the brackets 9 at the inner peripheries of the ring plates, therefore the larger parts of the ring base plates 11 extend beyond the outer periphery of the table 6, thus the space below the base plates 11 is unobstructed.

The upper face of each base plate is provided with a plurality of radially disposed slots or grooves 12 cut therein. A fruit or vegetable gripper 13 is slidably mounted in each slot 12, and a pin 14 is provided in each gripper 13 to extend above the upper face thereof. A ring plate or cam plate 16 is arranged over the top of the base plate 11 and over the gripper members 13, that are countersunk in said plate. The cam plate 16 is provided with a plurality of tangentially curved slots 17 therein, within which the projecting end of each of the gripper pins 14 is slidably confined.

Rotating the cam plate 16 with the tangentially curved slots 17 therein, causes the slidably mounted grippers 13 to be advanced or withdrawn, radially outwardly or inwardly relative to the center of the ring base plate 11. An annular ring or bezel 18 encircles the circumference of the ring base plate 11 and the upper side of said bezel 18 is attached to one side of the circumference of the cam plate 16. The bottom circumference of the bezel 18 is provided with an annular flange 19 thereon which engages an annular recess 21 on the bottom circumference of the ring base plate 11.

In order to rotate the cam plate 16 relative to the ring base plate 11, a handle 22 is provided on the top of the cam plate 16, protruding upwardly. By moving the handle 22 in a clockwise direction viewing Fig. 1, the cam plate 16 is also rotated in clockwise direction relatively to the ring base plate 11, so as to move the grippers 13 outwardly. The rotation of the cam plate 16 in the opposite direction will cause the moving of the grippers 13 inwardly into the gripping position thereof. The gripping movement of the grippers 13 is accomplished automatically, by reason of the rotation of the bezel 18 in a contra-clockwise direction, viewing Fig. 1, by an expansion spring 23. The spring 23 is connected at one end to the bezel 18 and at its opposite end to the table 6 so as to resist turning movement of the handle 22 and to act on the cam plate 16 to urge and maintain the grippers 13 in a gripping position.

In order to place an article in each gripper 7, to be pared, cored, pitted or otherwise trimmed or prepared, it is necessary to move the handle 22 so as to rotate the cam plate 16, in a clockwise direction, viewing Fig. 1, whereby the individual grippers 13 are moved back into a concealed position, permitting the article to be inserted into the center of the gripper 7. Then by releasing the handle 22, the spring 23 is allowed to automatically move the handle 22 in the opposite direction, moving the individual grippers 13 radially into the extended or gripping position thereof, and into engagement with the article to be worked upon, to hold said article in a relatively fixed position in the center of the holder or gripper 7 during the time that it is being cored, pared, pitted and trimmed. The individual grippers 13 are designed to center the article to be worked upon in line with the vertical axis of the holder or gripper 7, whereby said articles will properly register with a tool or instrument for performing the particular operation on the article, when moved by the rotation of the table 6 in juxtaposition with the respective tool.

The aforementioned coring, pitting and trimming of the article is accomplished during the travel of the holder or gripper 7 over about three-fourths of its circular path of travel, therefore the discharging of a trimmed article, and the placing of another article in the gripper 7, must be performed on the remaining fourth of the holder travel. This is accomplished automatically by the cam 8, which is fixedly held in operative relation to the handle 22, at the section of the path of holder travel, where there are no other operations performed on the article.

The cam 8 is sector shaped, and has an arcuate cam race 24 on the outer periphery thereof. The table 6 is rotated in a clockwise direction, viewing Fig. 1, and thus the handle 22 is brought into abutting relation with the corner of the cam 8, as in the holder position marked A. Due to the further rotation of the table 6, the holder 7 moves further in clockwise direction, but the abutment of the handle 22 against the cam 8, causes the handle 22 and the cam plate 16, to be turned in clockwise direction, viewing Fig. 1, whereby the grippers 9 are moved outwardly, releasing the article from the holder or gripper 7. At this time the handle 22 reaches a position in alignment with the outer cam race 24, and it rides thereon, whereby the grippers 13 are held in concealed position, permitting the insertion of another article in the holder or gripper 7. Further rotation of the table 6 moves the gripper 7 past the cam 8, thus the handle 22 rides off the cam 8 and after its release by the cam 8, the action of the spring 23 turns the handle 22 and the cam plate 16, in contra-clockwise direction, viewing Fig. 1. Thus the grippers 13 are brought into gripping engagement with the article in the holder or gripper 7. This action is repeated on all the grippers 7 in turn, as they travel past the cam 8.

For the purpose of illustration, I show the cam 8 secured to a post 26, which extends thru a hollow shaft 27, the latter being the drive shaft of the table 6. The post 26 is fixedly secured to the base of the machine in any suitable manner, not shown. The shaft 27 rotates around the post 26, so as to rotate the table 6. It is to be understood, that the cam 8 may be held stationary in any other suitable manner, such as on an overhead bracket.

The rotary table 6 is supported on a base 28, upon which are also supported the driving mechanism and the different coring, pitting, and trimming tools.

The aforedescribed automatically actuated grippers are used in connection with fruit or vegetable coring, pitting and trimming machines, such as for instance, the artichoke coring machine, described in my copending application, Serial No. 255,516, filed February 20, 1928. In that copending application, a form of the connection between the rotary table and the machine base, also of the intermittent table-rotating mechanism, and of the different coring and trimming tools and their operation, are set forth clearly.

Figure 2:
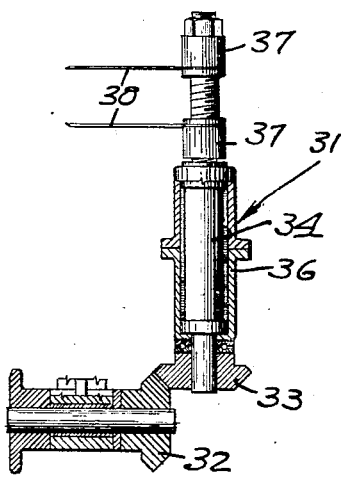
Fig. 2 is a sectional detail view of a cutting mechanism of the machine.
Figure 3:
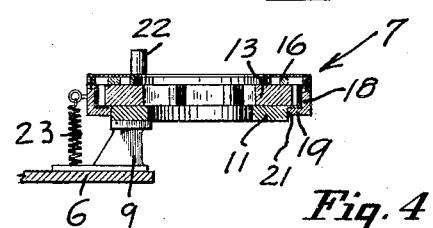
Fig. 3 is a sectional view of one of the grippers.
Figure 4:
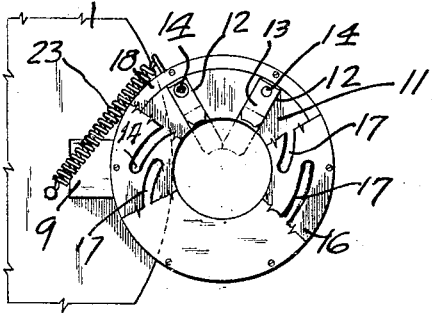
Fig. 4 is a plan view, with portions of the gripping mechanism cut away.

In Figs. 1 and 2 I also show a trimming mechanism 31, which is driven in the usual manner thru gears 32 and 33, the latter gear 33 rotating a shaft 34. The shaft 34 is rotatably supported in a housing 36, which in turn is suitably mounted on the base 28. The top of the shaft 34 extends above the table 6, at one side thereof, and the upper end thereof is threaded to receive locking collars 37 thereon. The collars 37 are spaced from each other and in each collar is fixedly secured a scimitar 38. The scimitars 38 are so spaced that when rotated one passes below and the other above the holder or gripper 7, trimming the top and the bottom of the article, such as an artichoke held in the gripper 7. This trimmer differs from the trimmer shown in my aforementioned copending application, in the substitution of scimitars 38, for the circular blades shown in that application.

It will be recognized that a particularly efficient automatic mechanism is provided to open and close the fruit or vegetable grippers of a rotary table of a fruit or vegetable trimming machine, thereby rendering such machines entirely automatic; the only manual operation necessary in the operation of said machines is the placing of the articles to be worked on, in the opened grippers. The automatic gripper mechanism is rugged in construction and positive in operation, it does not require any careful setting up or adjustment, therefore it readily lends itself to effective application by the labor ordinarily available.

Having thus described this invention, what I claim and desire to secure by Letters Patent is:

1. In combination a plurality of traveling holders; normally closed gripping means in each holder; a stationary element related to the path of the holder travel for opening the gripping means of each holder for a period when the respective holder travels past said element, each holder comprising a base, a plurality of slidable bars mounted on the base; and a plate rotatably mounted on said base, having a plurality of slots arranged tangentially to the axis of the plate, one end of each bar being adapted to extend into the slot, and being slid radially as the plate is rotated, said plate being adapted to engage said stationary element so as to be rotated thereby and resilient means operatively connected with said plate and normally maintaining the same in a position maintaining said gripping means in a gripping position.

2. In combination a plurality of traveling holders; normally closed gripping means in each holder; a stationary element related to the path of the holder travel for opening the gripping means of each holder for a period when the respective holder travels past said element, each holder comprising a base, a plurality of slidable bars mounted on the base; a plate rotatably mounted on said base, having a plurality of slots arranged tangentially to the axis of the plate, one end of each bar being adapted to extend into the slot, and being slid radially as the plate is rotated, said plate being adapted to engage said stationary element so as to be rotated thereby for the outward sliding of the radial bars; and spring means to automatically rotate said plate into grip closing position upon the disengagement of the plate from the stationary element.

3. In combination a plurality of traveling holders; normally closed grippings means in each holder; a stationary element related to the path of the holder travel for opening the gripping means of each holder for a period when the respective holder travels past said element, each holder comprising a base, a plurality of slidable bars mounted on the base; a plate rotatably mounted on said base, having a plurality of slots arranged tangentially to the axis of the plate, one end of each bar being adapted to extend into the slot, and being slid radially as the plate is rotated, said plate being adapted to engage said stationary element so as to be rotated thereby for the outward sliding of the radial bars; and resilient means to automatically rotate said plate into grip closing position upon the disengagement of the plate from the stationary element.

4. In combination a plurality of traveling holders; normally closed gripping means in each holder; a stationary element related to the path of the holder travel for opening the gripping means of each holder for a period when the respective holder travels past said element, each holder comprising a base; a plurality of radially slidable bars on said base; a plate rotatably mounted on said base having a plurality of slots arranged tangentially to the axis of the plate, each slot being related to one of the bars to slide the bars radially as the plate is rotated; and resilient means attached to the plate to urge the same into a position for holding the bars in extended gripping position; said plate being adapted to engage said element so as to be rotated thereby into a grip opening position during its travel past said element.

5. In combination a plurality of traveling holders; normally closed gripping means in each holder; a stationary element related to the path of the holder travel for opening the gripping means of each holder for a period when the respective holder travels past said element, each holder comprising a base; a plurality of radially slidable bars on said base; a plate rotatably mounted on said base having a plurality of slots arranged tangentially to the axis of the plate, each slot being related to one of the bars to slide the bars radially as the plate is rotated; resilient means attached to the plate to urge the same into a position for holding the bars in extended gripping poistion; and a projection extending from said plate so as to engage said stationary element during the travel of the respective holder past said element, so as to rotate and hold the plate in grip opening position during its engagement with the element.

6. In combination a plurality of traveling holders; normally closed gripping means in each holder; a stationary element related to the path of the holder travel for opening the gripping means of each holder for a period when the respective holder travels past said element, each holding member comprising a ring-like base having a plurality of grooves in one face thereof disposed radially to the axis of the base; a bar in each groove having a pin extended therefrom; an annular plate rotatably mounted on said base having a plurality of slots arranged circumferentially therearound tangentially to the axis of the plate, each slot having one of the bar pins confined therein to move all of the bars radially inward or outward relative to the grooved base in unison, as the plate is rotated; resilient means to hold the plate in gripping position; and a projection extending from said plate so as to engage said stationary element, whereby the plate is rotated and held in non-gripping position during its travel past said element.

7. In combination a rotary table; a plurality of circumferentially spaced holders thereon; each holder comprising a base mounted on the table; a plurality of radially slidable bars on said base; a plate rotatably mounted on said base having a plurality of slots arranged tangentially to the axis of the plate, one end of each bar being adapted to extend into the slot and being slid radially as the plate is rotated; a handle extending from the plate; a spring to urge the plate into a position corresponding to the extended gripping position of the bars; and a cam fixedly supported in operative relation to said holders in the path of said handle so as to engage said handle when a respective holder travels past the cam, thereby to rotate the plate into a bar concealing, non-gripping position and to hold said plate in such open position during a section of the holder travel, as the table is rotated.

8. In a device of the character described, a plurality of gripping units adapted to travel in a circular path, each gripping unit including gripping means normally yieldably held in closed position, a stationary cam operatively arranged at one point in the cycle of operation of the gripping units, and a device operatively connected with the gripping means of each unit and adapted to engage the cam as each gripping unit comes into register therewith whereby the cam will operate said device and move said gripping means to open position during the period the gripping unit is in register with the cam.

9. In a device of the character described, a plurality of gripping units adapted to travel in a circular path about a common center, each gripping unit including radially movable gripper members, a cam plate operatively connected with said gripper members, spring means normally yieldably holding said cam plate in a position yieldingly maintaining said gripper members in gripping position, and means disposed at one point in the cycle of operation of the gripping units for operating said cam plate against the influence of said spring means to move said gripper members to their non-gripping position.

10. In a device of the character described, a plurality of gripping units adapted to travel in a circular path about a common center, each gripping unit including radially movable gripper members, a cam plate operatively connected with said gripper members, spring means normally yieldably holding said cam plate in a position yieldingly maintaining said gripper members in gripping position, means disposed at one point in the cycle of operation of the gripping units for operating said cam plate against the influence of said spring means to move said gripper members to their non-gripping position, said means constituting a stationary cam arranged in operative relation to the gripping units and engageable with a fixed portion of the cam plate to operate the same.

In testimony whereof, I have hereunto set my hand at San Francisco, California, this 24th day of August, 1929.

GEORGE D. GARDNER.